United States Patent Office 3,719,639
Patented Mar. 6, 1973

3,719,639
FLAME RESISTANT POLYURETHANE POLYMERS
Theodor Reetz, Columbia, S.C., and J. W. Britain, New Martinsville, W. Va., assignors to Baychem Corporation, New York, N.Y.
No Drawing. Filed Mar. 12, 1971, Ser. No. 123,873
Int. Cl. C08g 22/16
U.S. Cl. 260—75 NQ
8 Claims

ABSTRACT OF THE DISCLOSURE

Flame-resistant polyurethane polymers are prepared by reacting a polyisocyanate with an organic compound having active hydrogen atoms which are reactive with —NCO groups and a chain-extending composition comprising a mixture of 2,2-bis(bromomethyl)-1,3-propanediol with a compound having one of the following formulas:

(I)
$$HO-CH_2CH_2-NH-\overset{O}{\underset{\|}{C}}-NH-CH_2CH_2-OH$$

(II)
$$HO-CH_2CH_2-NH-\overset{O}{\underset{\|}{C}}-\left(CH_2\right)_n-\overset{O}{\underset{\|}{C}}-NH-CH_2CH_2-OH$$

(III)
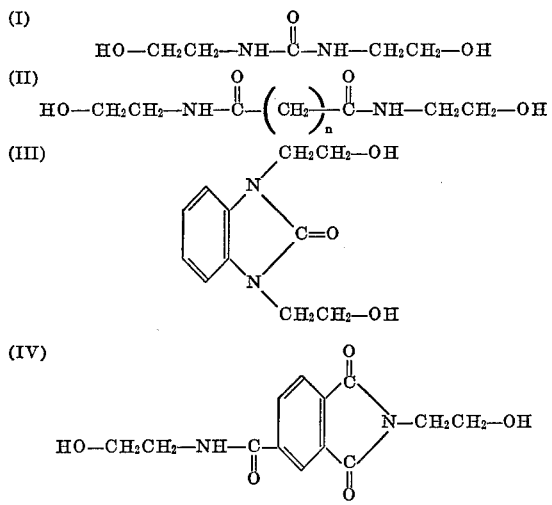

(IV)
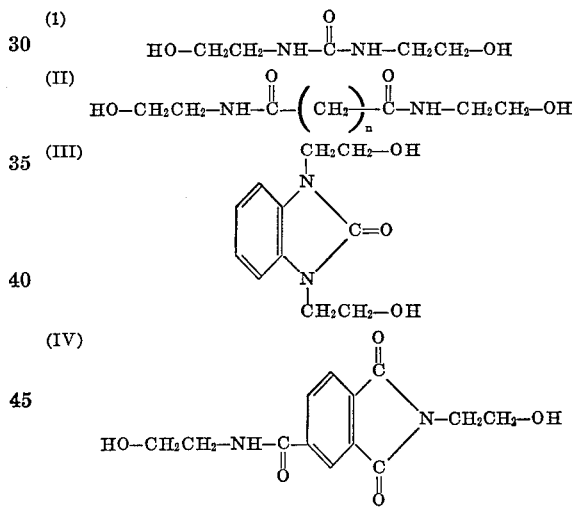

wherein $n$ is 0, 1 or 2.

This invention relates to polyurethane polymers and to a method of preparing the same. More particularly, the invention relates to polyurethane polymers of improved fire-resistancy having good physical and mechanical properties and to a method of preparing the same.

Polyurethanes which are flame retardant are highly desirable and required for many applications. It has heretofore been suggested that certain bromine compounds are effective fire retardant agents for flameproofing plastics, including polyurethanes. While it was thus possible to reduce the flammability of the polyurethane polymers, the resultant products were still objectionable for various reasons. For example, aliphatic bromine compounds are generally too unstable to be useful in certain applications since the inclusion of sufficient bromine compound to render the polyurethane fire-resistant produces an elastomer of poor physical properties. Generally, one or more of the desirable physical properties of the polyurethane plastics are impaired to some extent by these bromine-containing compounds.

It is, therefore, an object of this invention to provide flame-resistant polyurethane polymers and a process for preparing the same which are devoid of the foregoing disadvantages and problems. Another object of this invention is to provide flame-resistant polyurethane polymers having excellent physical characteristics and to a process for preparing the same. A further object of this invention is to provide polyurethane polymer compositions and a process for preparing the same wherein the polymers have improved mechanical properties and contain sufficient bromine to render the polymers flame-resistant. A still further additional object of this invention is to provide a process for producing elastomeric, non-porous polyurethanes of improved flame-resistance without impairing the desirable physical properties of the elastomers.

The foregoing objects and others which will become apparent from the following description are accomplished in accordance with this invention, generally speaking, by providing polyurethane polymers by reacting a substantially linear compound having active hydrogen atoms as determined by the Zerewitinoff test, which active hydrogen atoms are reactive with isocyanato groups, and an excess of an organic polyisocyanate with a chain-extending composition comprising a mixture of 2,2-bis(bromomethyl)-1,3-propanediol with a compound having one of the following formulas:

(I)
$$HO-CH_2CH_2-NH-\overset{O}{\underset{\|}{C}}-NH-CH_2CH_2-OH$$

(II)
$$HO-CH_2CH_2-NH-\overset{O}{\underset{\|}{C}}-\left(CH_2\right)_n-\overset{O}{\underset{\|}{C}}-NH-CH_2CH_2-OH$$

(III)

(IV)

wherein $n$ is 0, 1 or 2 in an amount at least sufficient to react with all the —NCO groups of the reaction product obtained from the organic compound having active hydrogen atoms and the organic polyisocyanate. Thus, the invention contemplates the preparation of polyurethane polymers wherein the chain-extending composition set forth above is used in place of the customarily used chain-extending agents.

It was indeed unexpected that the advantages set forth above were to be obtained with the chain-extending compositions of this invention since the use of 2,3-dibromo-butanediol with the compounds of Formulas I, II, III and IV do not result in the production of self-extinguishing polyurethane polymers with desirable mechanical and physical properties. Moreover, the benefits obtained when using the chain-extending compositions of this invention are also unexpected since improved results obtained when using 2,2-bis(bromomethyl)-1,3-propanediol with other chain-extenders is rather selective. That is, the benefits of this invention are not obtained when, for example, a chain-extending composition comprising 2,2-bis(bromomethyl) - 1,3 - propanediol with N,N'-bis(hydroxyethyl) amides of Formula II wherein $n$ is greater than 2, for example, N,N'-bis(2 - hydroxyethyl)adipamide or with N,N'-bis(hydroxyethyl)amides of aromatic dicarboxylic acids such as, for example, N,N'-bis(2-hydroxyethyl) phthalamides or N,N'-bis(2 - hydroxyethyl) - terephthalamide and the like are employed.

Any suitable substantially linear organic compound containing active hydrogen atoms may be used in the process of this invention, such as, for example, dihydroxyl polyesters, polyalkylene ether glycols, dihydric polythioethers, dihydric polyacetals, polyester amides and the like but it is preferred to use a polyhydric polyalkylene ether, a polyhydric polythioether and most preferably a hydroxyl polyester obtained by a process which comprises condensing a polycarboxylic acid and a polyhydric alcohol.

Any suitable hydroxyl polyester may be used in the process of this invention such as, for example, the condensation product of a polycarboxylic acid and a polyhydric alcohol.

Any suitable polycarboxylic acid may be used in the preparation of the hydroxyl polyester such as, for example, adipic acid, succinic acid, sebacic acid, suberic acid, oxalic acid, malonic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxymethylcyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxy ethylamine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl propane-4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol, arabitol, sorbitol, maltose, sucrose, ammonia, diethanolamine, triethanolamine, 2,4-tolylene diamine and the like. Any suitable alkylene oxide condensate may also be used such as, for example, the condensates of ethylene oxide, propylene oxide, butylene oxide, amylene oxide, styrene oxide and the like and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxypropyl sulfide, 4,4'-dihydroxybutyl sulfide, 1,4-(β-hydroxy ethyl)phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Mixtures of any of the compounds of the classes set forth hereinabove may be used also.

The organic compound containing active hydrogen atoms should preferably be substantially linear or only slightly branched and have a molecular weight of at least about 600 and for best results, a molecular weight of from about 1000 to about 3000, a hydroxyl number of from about 75 to about 35 and an acid number less than about 2.

Any suitable organic diisocyanate may be used in reaction with the organic compound containing active hydrogen atoms to produce polyurethane polymers, such as, for example, aliphatic, cycloaliphatic and aromatic and heterocyclic isocyanates, such as, for example, ethylene diisocyanate, ethylidene diisocyanate, propylene diisocyanate, butylene diisocyanate, hexamethylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate and their isomeric mixtures, dimeric tolylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate and the like. It is preferred that aromatic diisocyanates be used and for best results, 4,4'-diphenylmethane diisocyanate or isomeric mixtures of tolylene diisocyanates have proven to be especially suitable.

Any suitable chain extending agent having one of the Formulas I to IV, set forth hereinbefore, may be used in the process of this invention with the 2,2-bis(bromomethyl)-1,3-propanediol, such as, for example, N,N'-bis(2-hydroxyethyl)urea, N,N'-bis(2 - hydroxyethyl)oxalamide, N,N'-bis(2-hydroxyethyl)malonamide, N,N'-bis(2-hydroxyethyl)succinamide, 1,3-bis(2 - hydroxyethyl) benzimidazolone and N,N'-bis(2-hydroxyethyl)trimelliticimide-amide.

Any of the chain-extending agents having one of the Formulas I to IV, above, may be employed in the process of this invention in combination with 2,2-bis(bromomethyl)-1,3-propanediol in any suitable proportions. However, it is preferred that the chain-extending mixture comprises from about 10% to about 95% 2,2-bis(bromomethyl)-1,3-pentanediol, most preferably from about 50% to about 90% 2,2-bis(bromomethyl)-1,3-pentanediol with the remainder being a compound having one of the Formulas I to IV.

The chain extending agents of this invention are generally known compounds. The compound of Formula I is, for example, disclosed in U.S. Pats. 2,379,261 and 2,822,349. The compounds of Formula II may be prepared from dicarboxylic acids, their esters or amides with 2-ethanolamine under aminolytic conditions. N,N'-bis(2-hydroxyethyl)-trimelliticimide-amide may be prepared for example, by dissolving about 192 parts by weight of trimellitic anhydride in about 500 parts by volume of methanol under reflux and followed by cooling, then adding about 100 parts by volume of concentrated sulfuric acid to the mixture and refluxing for about 2½ hours at about 80° C., pouring the reaction into ice and adding about 150 parts by volume of ether, washing, separating and distilling the organic layer to prepare trimethyl trimellitate and reacting about 126 parts by weight of said trimethyl trimellitate with about 61 parts by weight of 2-ethanolamine at reflux for about two hours followed by distillation, washing with methanol and drying to obtain about 61.3 parts by weight of the imide-amide having a melting point of about 158° C. By reacting about 97.0 parts by weight of ethylene carbonate with about 67.0 parts by weight of benzimidazolone in about 50 parts by volume of dimethylformamide in the presence of about 1 gram of sodium methoxide at about 154° C. for about 1½ hours with the evolution of $CO_2$ followed by pouring of the reaction mixture into about 700 parts by volume of water, cooling, filtering and drying, one can obtain N,N'-1,3-bis(2-hydroxyethyl)benzimidazolone.

In some cases it may be necessary to increase the rate of reaction of the active hydrogen containing organic compounds and the organic polyisocyanate and if this is desired, one may use any suitable catalyst for the isocyanate-active hydrogen reaction, such as, for example, tertiary amines, such as N-ethylmorpholine, dimethyl benzyl amine, dimethyl stearyl amine, N,N'-endoethylene piperazine, triethylene diamine and the like as well as metal catalysts such as dibutyl tin dilaurate, dibutyl tin-di-2-ethyl hexoate, stannous octoate, stannous oleate, lead naphthanate and the like and mixtures thereof.

The purpose of this invention is applicable to the preparation of elastomeric products by the various methods known to those skilled in the art. Thus, the organic compound containing active hydrogen atoms, the polyisocyanate and the chain-extending composition can be mixed together in the proper proportions and cast in the usual casting technique into a mold having the desired configuration. Also, this same result can be accomplished by first reacting the polyisocyanate and the organic compound containing active hydrogen atoms to obtain a —NCO terminated prepolymer and then mixing this prepolymer with the chain-extending composition in the casting technique.

In any case the reaction mixture is cast into a mold where it is cured at any suitable temperature and preferably at a temperature within the range of about 100° C. to about 150° C., the curing time being somewhat dependent on the temperature at which curing is effected. Most preferably, the final mixture of reaction components is cast into a mold and cured at a temperature of about 110° C. for about 24 hours.

The process is also useful in the millable gum technique wherein the organic compound containing active hydrogen atoms, the chain-extending composition and a deficiency of the polyisocyanate are first reacted to form a millable gum and then this millable gum is further mixed with an additional quantity of an organic polyisocyanate such as dimeric tolylene diisocyanate on a roll mill such as that used in the rubber industry, and the final product formed by a compression molding technique or the like. In this millable gum technique, a suitable peroxide such as, for example, dicumyl peroxide may be incorporated into the millable gum to bring about the cross-linking.

In addition, the process of this invention is useful in what has been termed the thermoplastic technique wherein the reaction compounds are mixed and caused to partially react. The reaction is then interrupted while the material can still be worked by thermoplastic techniques. At this point the material is generally in the solid state. This solid partially reacted material can be fabricated into the desired final form by molding techniques such as, for example, compression molding, injection molding, extrusion, and the like. In this technique, as well as in the casting and millable gum procedures, a one-shot mixing system or a prepolymer procedure can be followed.

The individual reaction components and the proportion in which they are added can be chosen according to the basic properties desired of the end product. However, it is preferred that the isocyanate be present in an amount sufficient to react with all of the active hydrogen atoms present and particularly in an amount such that a slight excess is present based on the active hydrogen atoms present in the other reaction components. For best results, it is preferred that the isocyanate be present in an amount such that the NCO to active hydrogen ratio is from about 1.0 to about 1.1.

The polyurethane plastics obtained by the process of the present invention are useful in a variety of applications, such as, for example, the preparation of molded articles, tires, toyps, shoe heels, bearings, gear wheels, valve seals, as insulated cable covering for electrical wire and the like.

The invention is further illustrated but is not intended to be limited by the following examples in which all parts and percentages are by weight unless otherwise specified.

EXAMPLES 1–25

Elastomers were prepared in a mixer by employing polyester, chain-extender mixture and isocyanate in a molar ratio of about 1:2:3.15, respectively. About 1.0 molar portion of a polyester having a molecular weight of about 2000 and a —OH number of about 58 prepared by condensing about 1 mol of adipic acid with about 1.09 mols of ethylene glycol is dehydrated by heating to a temperature of about 125° C. and reacted for about 30 to about 60 minutes with about 3.15 molar portions of 4,4'-diphenylmethane diisocyanate and about 2.0 molar portions of the chain-extender mixtures set forth in the table below. When chain-extending mixtures containing 2,2-bis(bromomethyl)-1,3-propane-diol were employed, a catalyst was required so 1 drop of stannous octoate catalyst was added to the polyester and mixed with the extender prior to the addition of the diisocyanate. The reaction mixture was pressed into a hot mold removed and cured by heating to a temperature of about 110° C. for about 24 hours. The resulting substantially homogeneous polyurethane plastics obtained exhibit the following physical characteristics. The values represent the average values obtained from 4 to 6 slabs from each elastomeric reaction mixture.

In the table set forth below, the symbols employed have the following meanings:

I: N,N'-bis(2-hydroxyethyl)urea
II: N,N'-bis(2-hydroxyethyl)oxalamide
III: N,N'-bis(2-hydroxyethyl)malonamide
IV: N,N'-bis(2-hydroxyethyl)succinamide
V: N,N'-bis(2-hydroxyethyl)adipamide
VI: N,N'-bis(2-hydroxyethyl)terephthalamide
VII: N,N'-bis(2-hydroxyethyl)phthalamide
VIII: N,N'-bis(2-hydroxyethyl)trimelliticimide-amide
IX: N,N'-1,3-bis(2-hydroxyethyl)benzimidazolone
X: 2,2-bis(bromomethyl)-1,3-propanediol
B: burns
SE: self-extinguishing—a composition is considered to be self-extinguishing if it stops burning shortly after a flame used to start its burning has been removed or the material is taken out of the flame.

TABLE

| Ex. No. | Chain extender mixture | Percent X in chain | Tensile, p.s.i. | Elongation | | Modulus (p.s.i.) | | | Hardness | | Fire resistancy |
|---|---|---|---|---|---|---|---|---|---|---|---|
| | | | | Percent | Set | 100% | 200% | 300% | Shore A | Shore D | |
| 1 | I | --- | 5,650 | 410 | 75 | 1,000 | 1,650 | 2,700 | 88 | 38 | B |
| 2 | I+X | 50 | 3,325 | 400 | 27 | 200 | 425 | 700 | 60 | 18 | SE |
| 3 | I+X | 90 | 5,650 | 570 | 0 | 200 | 200 | 200 | 62 | 18 | SE |
| 4 | II | --- | 5,100 | 495 | 108 | 1,050 | 1,725 | 2,550 | 89 | 45 | B |
| 5 | II+X | 50 | 5,600 | 465 | 17 | 300 | 500 | 1,050 | 78 | 40 | SE |
| 6 | II+X | 90 | 6,000 | 540 | 0 | 50 | 100 | 100 | 64 | 20 | SE |
| 7 | III | --- | 4,800 | 415 | 96 | 800 | 1,500 | 2,500 | 82 | 38 | B |
| 8 | III+X | 50 | 6,050 | 485 | 7 | 300 | 475 | 825 | 72 | 27 | SE |
| 9 | III+X | 90 | 6,300 | 550 | 0 | 100 | 100 | 100 | 63 | 20 | SE |
| 10 | IV | --- | 4,650 | 450 | 85 | 900 | 2,500 | 1,275 | 80 | 30 | B |
| 11 | IV+X | 50 | 5,700 | 500 | 18 | 275 | 450 | 700 | 70 | 20 | SE |
| 12 | IV+X | 90 | 6,800 | 575 | 0 | 200 | 250 | 250 | 64 | 21 | SE |
| 13 | V | --- | 2,900 | 450 | 510 | 750 | 1,000 | 1,500 | 88 | 35 | B |
| 14 | V+X | 50 | 4,700 | 450 | 50 | 500 | 950 | 1,600 | 77 | 28 | B |
| 15 | V+X | 90 | 2,300 | 290 | 55 | 1,100 | 1,600 | --- | 85 | 33 | B |
| 16 | VI | --- | 1,400 | 150 | 65 | 1,300 | --- | --- | 97 | 48 | B |
| 17 | VI+X | 50 | 2,050 | 350 | 30 | 475 | 900 | 1,500 | 75 | 30 | B |
| 18 | VII | --- | 700 | 45 | 6 | --- | --- | --- | 97 | 36 | B |
| 19 | VIII | --- | 4,400 | 435 | 130 | 875 | 1,465 | 2,400 | 95 | 42 | B |
| 20 | VIII+X | 50 | 4,200 | 450 | 0 | 200 | 300 | 550 | 72 | 27 | SE |
| 21 | VIII+X | 90 | 4,425 | 550 | 0 | 150 | 190 | 200 | 66 | 22 | SE |
| 22 | IX | --- | 6,800 | 455 | 3 | 350 | 500 | 1,150 | 75 | 31 | B |
| 23 | IX+X | 50 | 6,750 | 480 | 0 | 50 | 100 | 200 | 68 | 23 | SE |
| 24 | IX+X | 90 | 5,425 | 560 | 0 | 100 | 160 | 160 | 65 | 21 | SE |
| 25 | X | 100 | 3,000 | 675 | 25 | 100 | 100 | 100 | 64 | 18 | SE |

While the use of 2,2-bis(bromomethyl)-1,3-propanediol alone as a chain-extender rendered the polyurethane elastomer fire resistant, the physical properties of the elastomer are impaired, particularly the tensile strength. However, the replacement of only 10% of the 2,2-bis(bromomethyl)-1,3-propanediol chain-extender with the chain-extending compounds of this invention results in a self-extinguishing elastomer of greatly improved tensile strength as well as acceptable elongation, set, modulus and hardness properties. The replacement of a portion of the 2,2-bis(bromomethyl)-1,3-propanediol with the hydroxyamide compounds of this invention, in fact, results in a synergistic effect on the physical properties of the elastomers since the properties of the elastomers prepared from the mixed chain extender, particularly at the 10/90 ratio of extenders, are generally better than those obtained from elastomers obtained with the use of either the hydroxyamides or the 2,2-bis(bromomethyl)-1,3-propanediol alone. Yet, with the use of such closely related hydroxyamide compounds as N,N' - bis(2 - hydroxyethyl) adipamide, N,N'-bis(2-hydroxyethyl)terephthalamide or N,N' - bis(2 - hydroxyethyl)phthalamide in combination with 2,2-bis(bromomethyl)-1,3-propanediol the results of this invention are not obtained. The use of such chain-extender mixtures, in fact, results in elastomers of poor physical properties as shown by the table.

It is, of course, to be understood that any of the organic compounds containing active hydrogen atoms and any suitable organic polyisocyanate may be used in the working examples for the specific compositions utilized therein and that the above examples are merely illustrative of the invention.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. An elastomeric non-porous polyurethane polymer produced by a method comprising reacting an organic polyisocyanate with an organic compound having active hydrogen atoms which are reactive with —NCO groups and a chain-extending composition comprising a mixture of 2,2-bis(bromomethyl) - 1,3 - propanediol with a compound having one of the following formulas:

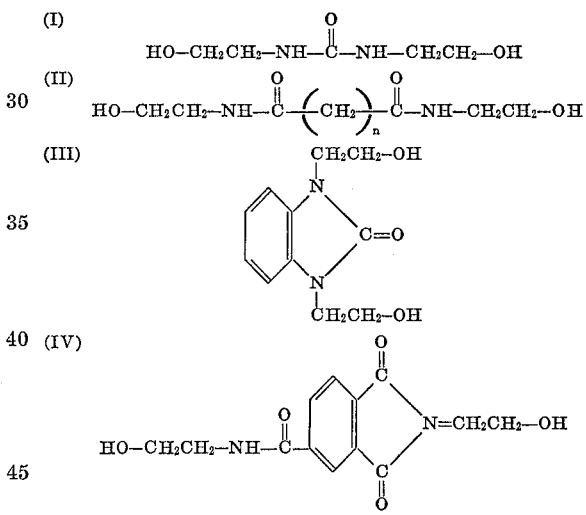

wherein $n$ is 0, 1 or 2.

2. The polyurethane polymer of claim 1 wherein the chain-extending composition comprises a compound having Formula II and 2,2-bis(bromomethyl)-1,3-propanediol.

3. The polyurethane polymer of claim 1 wherein the organic compound containing active hydrogen atoms is selected from the group consisting of dihydroxyl polyesters, polyalkylene ether glycols, dihydric polythioethers and dihydric polyacetals.

4. The polyurethane polymer of claim 1 wherein the organic polyisocyanate is an aromatic diisocyanate.

5. The polyurethane polymer of claim 1 wherein the organic polyisocyanate is 4,4'-diphenylmethane diisocyanate.

6. The polyurethane polymer of claim 1 wherein the organic polyisocyanate is tolylene diisocyanate.

7. The polyurethane polymer of claim 5 wherein the organic compound containing active hydrogen atoms is a dihydroxyl polyester.

8. The polyurethane polymer of claim 1 wherein the organic polyisocyanate is reacted with the organic compound containing active hydrogen atoms reactive with —NCO groups in a first step to prepare an NCO terminated prepolymer and reacting said NCO terminated prepolymer with the chain-extending composition.

References Cited

UNITED STATES PATENTS

| | | | |
|---|---|---|---|
| 2,822,349 | 2/1958 | Mueller | 260—75 |
| 3,087,912 | 4/1963 | Wagner et al. | 260—67 |
| 3,256,284 | 6/1966 | Rio | 260—268 |
| 3,267,077 | 8/1966 | Windemuth et al. | 260—75 |
| 3,305,533 | 2/1967 | Thoma et al. | 260—75 |
| 3,388,100 | 6/1968 | Thoma et al. | 260—75 |
| 3,475,383 | 10/1969 | Stewart | 260—75 |
| 3,522,304 | 7/1970 | Vogt | 260—533 |

DONALD E. CZAJA, Primary Examiner

H. S. COCKERAM, Assistant Examiner

U.S. Cl. X.R.

260—67, 77.5 AM, 77.5 AQ, DIG. 24